United States Patent [19]

Wallace et al.

[11] 4,155,842
[45] May 22, 1979

[54] DOCUMENT HOLD AND VIEW STATION FOR HIGH SPEED ITEM SORTER APPARATUS

[75] Inventors: Harry L. Wallace, Garden City; John D. Thomas, Plymouth, both of Mich.

[73] Assignee: Burroughs Corporation, Detroit, Mich.

[21] Appl. No.: 841,563

[22] Filed: Oct. 12, 1977

[51] Int. Cl.$^2$ .......................... B07C 5/36; B07C 9/00
[52] U.S. Cl. .................................. 209/552; 209/569; 209/583; 198/722; 271/64; 271/273
[58] Field of Search ................... 209/71, 72, 73, 74 R, 209/74 M, 111.7 R, 111.7 T, 111.8, 509, 522, 569, 583; 271/64, 266, 272, 273, 274; 214/1 M; 198/722

[56] References Cited

U.S. PATENT DOCUMENTS

| | | | |
|---|---|---|---|
| 3,239,216 | 3/1966 | Pfleger | 271/266 |
| 3,952,874 | 4/1976 | Owen | 209/DIG. 1 |
| 3,972,522 | 8/1976 | Wallace | 271/64 |
| 4,068,212 | 1/1978 | Templeton | 271/64 X |

*Primary Examiner*—Joseph J. Rolla
*Attorney, Agent, or Firm*—Carl Fissell, Jr.; Kevin R. Peterson

[57] ABSTRACT

An item/document hold and view station for use with high speed item sorting apparatus wherein a diverter is provided for diverting selected items out of the mainstream item pathway and into an open ended receptacle area for visual viewing by an operator and including a pair of eccentric cam members interconnected by a flexible member is operable to move the item out of the viewing station and back into the mainstream item pathway once the item has been altered, changed, corrected or otherwise handled by the operator without blocking or obscuring the data from the operator's view.

3 Claims, 8 Drawing Figures

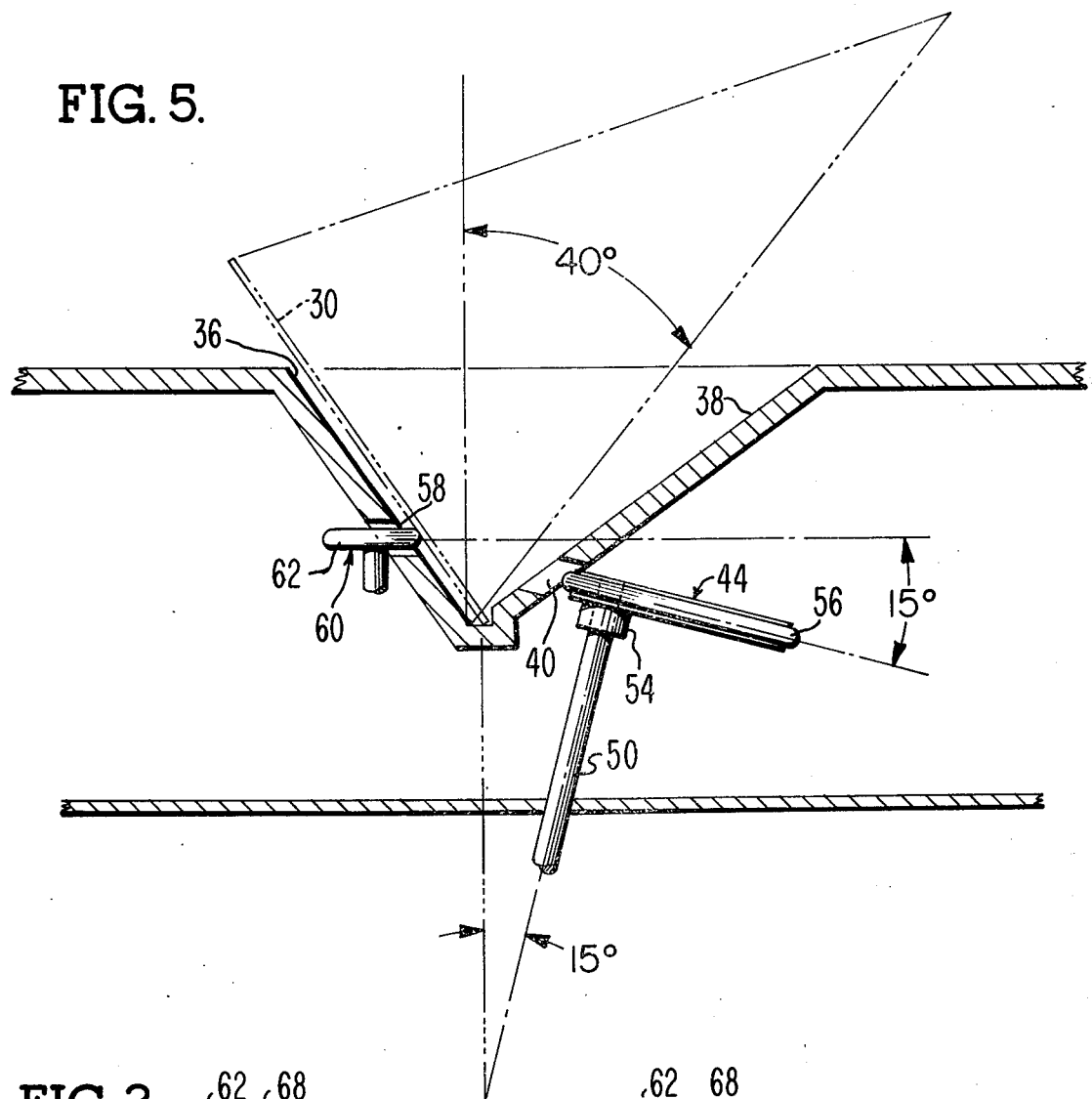
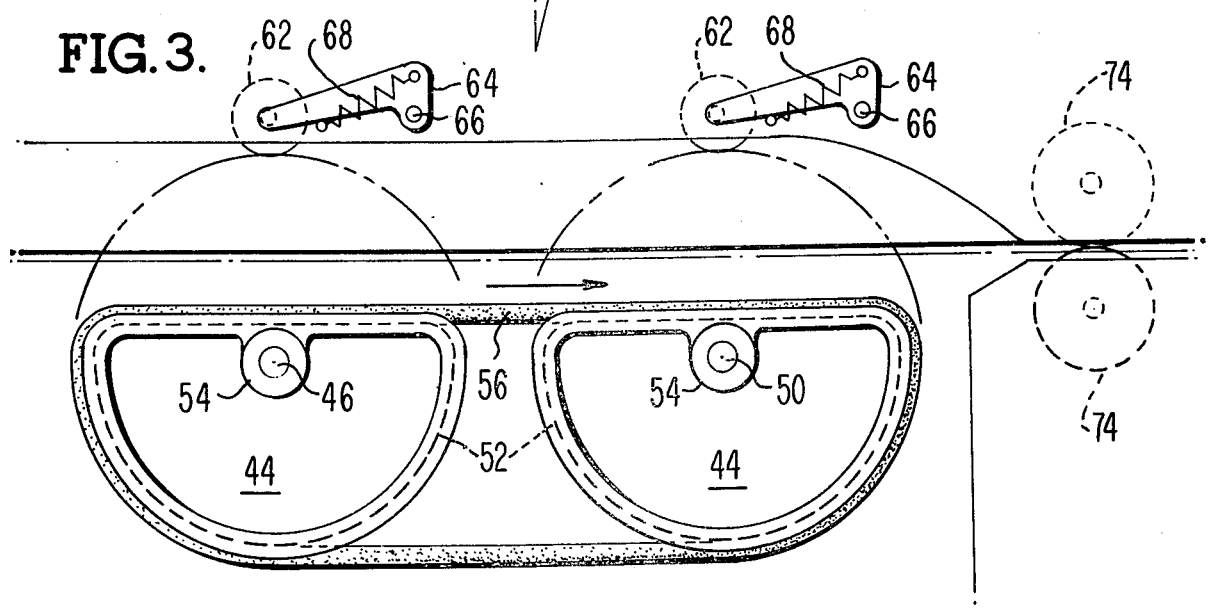

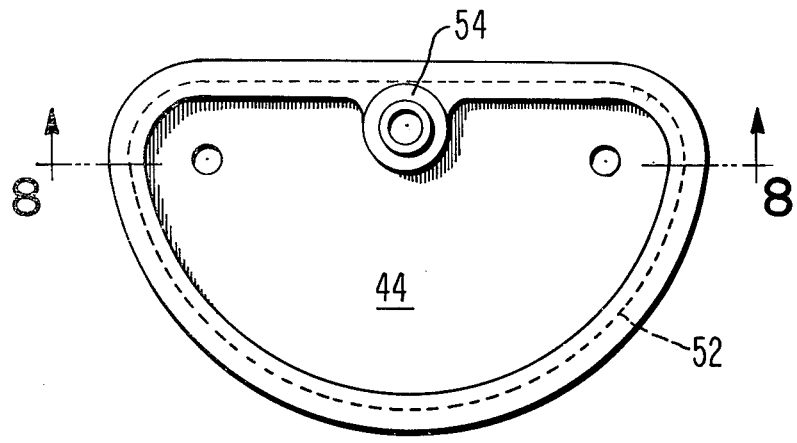
FIG. 6.
FIG. 7.
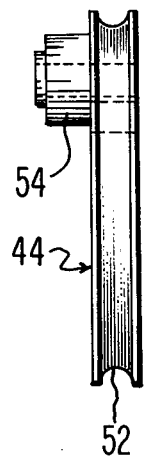
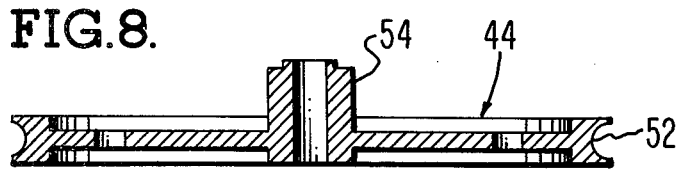
FIG. 8.
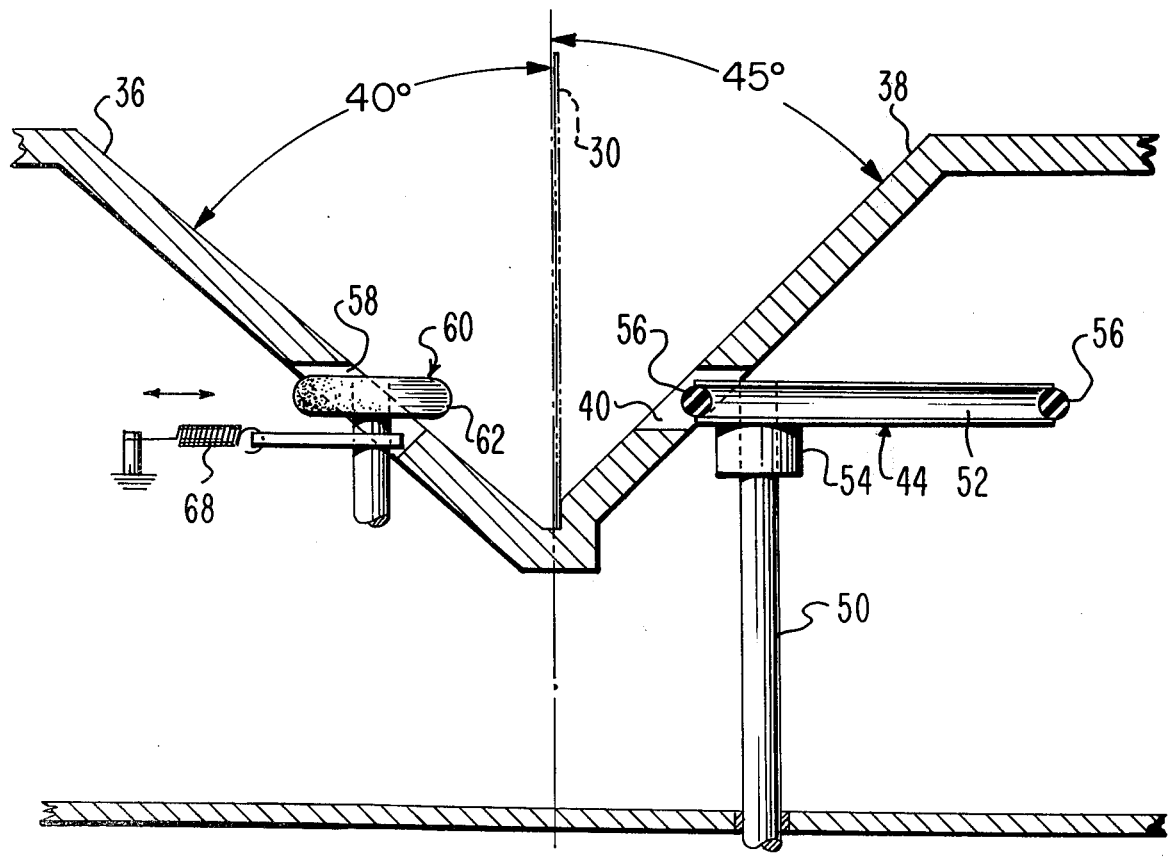
FIG. 4.

DOCUMENT HOLD AND VIEW STATION FOR HIGH SPEED ITEM SORTER APPARATUS

BACKGROUND OF THE INVENTION

1. Field of the Invention

The invention relates broadly to item sorting apparatus and to apparatus for diverting items out of the mainstream of items being sorted, holding and viewing an item permitting the data carried by said item to be corrected and/or altered or adjusted as required.

2. Prior Art

High speed item sorters such as, for example, those item/document sorters of the type for sorting checks have a requirement for being able to correct certain entries such as the courtesy amount, i.e. the amount written or printed designating the sum to be paid. Prior art apparatus provides electromechanical means such as finger-like members disposed at a selected area of the item stream or pathway at which position the item is abruptly halted in its flight while a pair of lifting elements vertically erect or project the item into a position such that the machine operator may view the amount to be corrected and enter the correct amount thereon. Thereafter, the document is lowered back down into the item path or guideway and is moved back into the mainstream of items being sorted.

In many such pieces of apparatus, if not most of them, the item to be corrected must be momentarily halted in its flight and/or removed from the stream of documents being handled by the apparatus. This necessitates a shutdown of the read/sort operation for whatever period of time it takes to make the correction or to direct the item to another position in the machine for correction at a later time. Another problem encountered with prior art apparatus is that of inability to view the entire document, for example, a check. The item is gripped by the means utilized to erect the item into view for the operator's perusal but a portion of the lower edge of the item is generally obscured from the operator's view by the very apparatus used in camming the document upwardly. This often blocks the view sufficiently so that part of the data which normally should be available to be read, such as the MICR encoding including the amount, the bank number, the routing, etc. is obscured, out of sight, and therefore this can lead to mistakes in handling of the document data.

SUMMARY OF THE INVENTION

The present invention avoids the problems of the prior art by providing a diversionary offshoot or loop out of the mainstream path or guideway into which the item or document is fed and at which point the document may be momentarily halted. In this fashion the mainstream flow of documents is uninterrupted. At the loop area, a "hold and view station" is established wherein the document is completely visible to the operator, since it is unobstructed by the means for moving the document. In the hold and view station a pair of eccentric, semicircular cam or drive members which are or may be interconnected by a flexible element are utilized to reinsert the document into the mainstream or flow of documents. Since only the rear half portion of the drive members is used, the entire area of the lower edge of the document is completely unobstructed to view enabling the operator to note the error and initiate the necessary steps to correct the same. Should such correction require removal of the item for operator handling, this is simply and easily accomplished since, unlike the prior art apparatus, the document is free from physical restraint or retention within the view station and can be handled at will without disruption of the read/sort operation of the flow of items.

BRIEF DESCRIPTION OF THE DRAWINGS

FIG. 3 is an enlarged top plan view (not to scale) of the operational elements of the hold and view station;

FIG. 4 is an end view, partially in section, of the hold and view station of FIG. 3;

FIG. 5 is a view similar to FIG. 4 but of an alternative embodiment of the apparatus of FIG. 4;

FIG. 6 is a greatly enlarged top plan view of one of the semicircular eccentric drive members of the apparatus of FIG. 3;

FIG. 7 is an edge view of the element of FIG. 6; and
FIG. 8 is a sectional view of the element of FIG. 6.

DESCRIPTION OF THE PREFERRED EMBODIMENT

Figure 1:
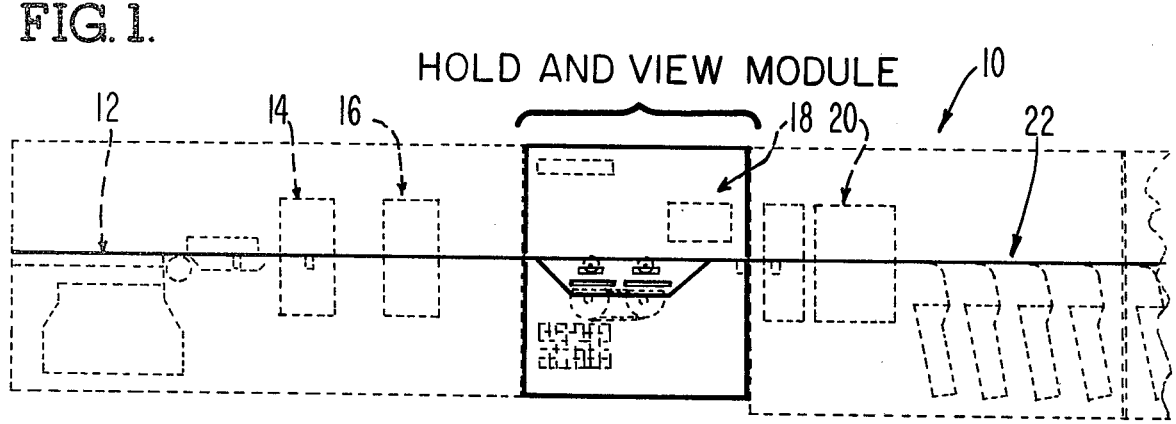
FIG. 1 is a schematic plan view of a reader/sorter apparatus illustrating the hold and view station of the present invention.

The present apparatus is fabricated as a modular assembly which is or may be joined with or form part of a high speed document/item sorter 10 as shown in FIG. 1 in dotted outline so as to highlight the present invention while setting forth an environment therefore. Items to be sorted are fed by means of a demand and feed assembly 12 passed a read assembly 14 to a courtesy amount read assembly 16 where determination is made as to whether reading of the MICR, OCR or courtesy amount can be accomplished by the apparatus and, if not, then the item whose data cannot be read is detoured "off line" to the hold and view assembly 18, as will be described shortly in detail herein.

Those items which must be corrected are thus directed out of the path of movement of the mainstream of items by means of the hold and view assembly 18 while the remainder of the items being read and sorted are passed on to an encoder/endorser assembly 20 for suitable handling thereat. From this point the items are stacked in stacker pockets according to a prefixed, prearranged code by means of stacker module 22 which may include multiple assemblies depending upon the desired output and the number of different document sortings required.

Figure 2:
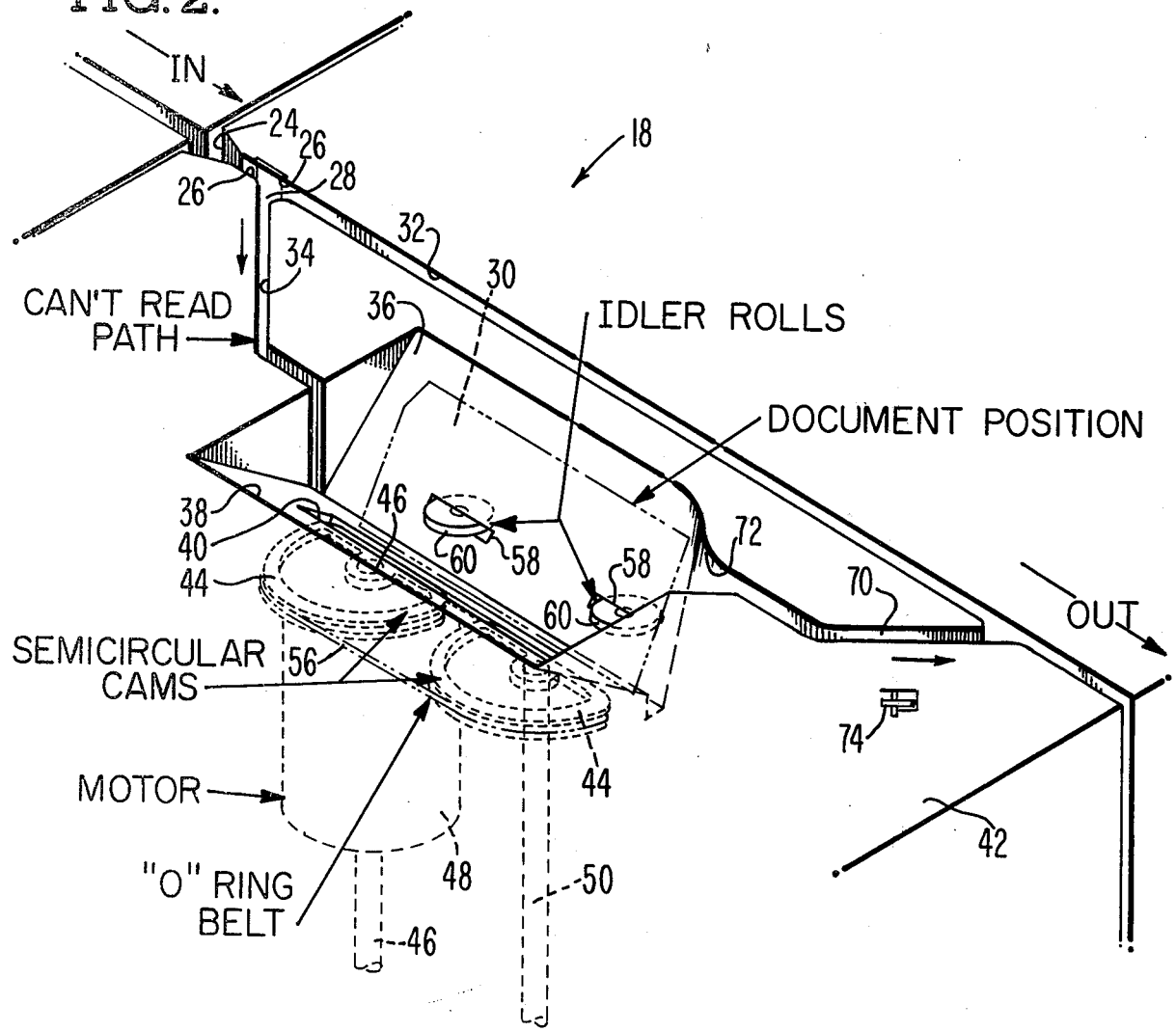
FIG. 2 is a perspective view of the hold and view station.

As seen particularly in FIG. 2, the hold and view assembly 18 of the present invention comprises a modular unit of substantially rectangular configuration including an input path 24 formed by means of the facing parallel upstanding wall members 26—26. The entering portion of each of the wall members 26—26 is chamfered slightly so as to prevent any obstruction or "hang up" of the passing items as they leave the previous assembly 16 and enter the hold and view station 18. Gating means 28, e.g. movable vane or flipper is provided in the straight line pathway portion of module 18 so as to divert the non-readable items 30 out of the mainstream item pathway 32 of module 18 and into an angularly disposed "offshoot" path 34.

Pathway 34 opens out into a shallow, topless, rectangular, V-bottomed receptacle area 36 into which item 30 is driven to come to rest in a canted, backwardly angled, upright position for viewing by the operator.

The forward portion 38 of the V-shaped receptacle 36 is provided with an elongated slot-like opening 40 extending horizontally across the slanted face of the wall portion. Disposed beneath the top plane 42 of the module 18 and adjacent to opening 40 are two substantially identical eccentric cam members 44—44. The leftmost member 44 is secured to and rotatable with a drive shaft 46 extending vertically upwardly from a drive motor 48, the latter being energized from a source of electrical potential (not shown). The rightmost eccentric cam member 44 is rotatable on a support shaft 50, as seen in the detailed views of FIGS. 6, 7 and 8. Each of the members 44—44 is substantially semicircular in shape and outline and is provided with a peripheral groove 52, for purposes to be explained shortly, and an upstanding hub 54 for attachment of the members 44 to their respective supporting shafts. A flexible O ring-like member 56 of rubber, neoprene or similar resilient material is received in the grooves 52 of members 44 and arranged to span the gap therebetween as seen most clearly in FIGS. 2 and 3 of the drawings.

The rear forwardly facing slanted wall of receptacle 36 is provided with a pair of slotted openings 58—58 into and through which are disposed individual idler-pressure wheels 60—60 as seen in FIGS. 4 and 5. Each pressure wheel 60—60 has a rim of resilient material 62 such as rubber, etc. whose coefficient of friction is sufficiently high to cause the wheels to roll with contact between the wheel rim and an item 30, as will be more apparent shortly herein. Each wheel 62 is carried by an L-shaped arm 64, FIG. 3, pivoted at 66 and biased forwardly, i.e. into the respective opening 58 by means of a spring 68 for contact with items 30.

The output side of the assembly 18 is provided with an angled pathway 70 leading from the receptacle 36 back into the main item guideway 32. The entering portion of pathway 70 is angularly offset and curved slightly, as indicated at 72, so as to provide a smooth transition from one area to another and so as to prevent any obstruction to or hang up of items as they leave the hold and view area and enter the mainstream again. The wall area 72 is curved in such a fashion as to permit departing item 30 to move smoothly into the existing guideway 70. The downstream driving roller 74 moves the now corrected item back into the mainstream guideway quickly, easily and effectively.

As seen most clearly in FIG. 4, the receptacle area 38 is substantially V-shaped as earlier noted herein. The angular relationship of the two confronting walls is a function generally of the viewing angle of the operator and can be varied to suit the average-height distance factors with respect to the operator's sitting position adjacent to the "hold and view" station.

In FIG. 5, the example, it can be seen that the viewing angle is slightly increased by canting the front wall 38 toward the operator and by placing the semicircular drive members 44—44 at a 15 degree angle offset from the perpendicular.

OPERATION

The "hold and view" module 18, as noted before herein, is or may be a separate assembly which can be added into the existing reader-sorter apparatus as shown in FIG. 1. Situated in place, a straight uninterrupted guideway is provided thereby extending from the input end 12 to the output pockets 22.

The entering item 30, FIGS. 2, 4 and 5, is fed by the usual feeding means (not shown) along the item guideway until a position is reached just ahead of the entering offshoot path 34. At this point, a "can't read signal" from associated electronic, hardware/software, not shown, provides a signal output energizing diverting means 28, for example, a flapper, gate, vane, etc. effective to close the mainstream pathway and divert the item into the angled pathway 34 leading into the open "hold and view" area of the V-bottom receptacle 36. The foward speed of the item is sufficient to cause it to come to rest on its side within the receptacle 36 for viewing by the operator. Meanwhile the remaining items from the input end of the apparatus are fed in normal fashion along the mainstream pathway, the flapper 28 having been automiatically reset after the "can't read" item passes thereby.

The operator now can scan the document in its entirety with an unobstructed view thereof since the means for moving the item out of the area is retracted out of the way of the item. After taking whatever steps were determined to be required or necessary, the operator energizes the drive motor 48 over lines, not shown, causing the semicircular members 44—44 to rotate rapidly bringing their respective perimeters 180 degrees about so that the resilient drive belt 56 stretched therebetween spans the item and contacts the same pressing the item against the resilient material 62 of rollers 60—60 and causing the item to be abruptly driven out of the area 36 and into the nip of rollers 74—74 effective to place the item back into the back stream of items passing through the apparatus. The cam members 44—44 are effective to move the item out of the hold and view station without the employment of drive belt 56, however, drive belt 56 acts in the nature of a document guide for the item and tends to prevent or avoid any hang-up or crumpling of the item between cams 44—44.

What is claimed is:

1. A hold and view station for reader/sorter apparatus wherein items such as checks and the like which for one reason or another cannot be read and properly sorted are diverted out of a mainstream item pathway into an unobstructed viewing area or station for suitable correction comprising:

an item pathway along which items to be read and sorted are fed at high speed including one or more sorting pockets for receiving items which have been read, a hold and view area off-line with respect to said main item sorting pathway for receiving items which cannot be read by reading means, and means for diverting items which cannot be read out of the mainstream of readable items and into said hold and view area, means in said hold and view area for contacting said items along the transverse axial dimension thereof and for abruptly moving said items out of said hold and view area and back into the mainstream item pathway after correction in response to suitable signal information provided by said apparatus said means for moving said items out of said hold and view area further comprises a pair of semicircular cam members vertically disposed for rotation along the transverse axis of said items and being provided with a flexible peripheral member disposed about the peripheries of said cam members for contact with the surface of the items effective when said cam members are rotated to guide said items while moving the same out of said hold and view area and back into the mainstream of items being sorted.

2. The invention in accordance with claim 1 wherein said cam members are disposed at an angle relative to the perpendicular effectively increasing the operator angle of view with respect to the item within said hold and view area.

3. The invention in accordance with claim 1 wherein each of said cam members is independently rotatable and wherein the periphery of each member is provided with a high coefficient of friction material for intimate contact with said item during the time that the cam member is in contact with the item within the hold and view area.

* * * * *